(12) United States Patent
Corrigan et al.

(10) Patent No.: US 7,844,781 B2
(45) Date of Patent: Nov. 30, 2010

(54) METHOD, APPARATUS, AND COMPUTER PROGRAM PRODUCT FOR ACCESSING PROCESS LOCAL STORAGE OF ANOTHER PROCESS

(75) Inventors: Michael J. Corrigan, Rochester, MN (US); Paul LuVerne Godtland, Rochester, MN (US); Richard Karl Kirkman, Rochester, MN (US); Wade Byron Ouren, Rochester, MN (US); George David Timms, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/360,351

(22) Filed: Feb. 23, 2006

(65) Prior Publication Data
US 2007/0208882 A1 Sep. 6, 2007

(51) Int. Cl.
*G06F 12/06* (2006.01)
(52) U.S. Cl. ............... 711/147; 718/101; 714/E11.179; 714/E11.178
(58) Field of Classification Search ............ 711/147, 711/148, 170, 202, 203; 709/214, 215, 216, 709/245; 718/101, 102, 104; 714/E11.179, 714/E11.178, E11.188; 717/127
See application file for complete search history.

(56) References Cited

U.S. PATENT DOCUMENTS

| | | | |
|---|---|---|---|
| 5,581,765 A | 12/1996 | Munroe et al. | |
| 5,636,376 A * | 6/1997 | Chang | 718/104 |
| 5,675,798 A * | 10/1997 | Chang | 709/224 |
| 6,243,762 B1 | 6/2001 | Greene et al. | |
| 6,574,721 B1 | 6/2003 | Christenson et al. | |
| 6,581,063 B1 | 6/2003 | Kirkman | |
| 6,681,239 B1 | 1/2004 | Munroe et al. | |
| 6,738,889 B2 | 5/2004 | Godtland et al. | |
| 6,868,450 B1 | 3/2005 | Lucovsky | |
| 7,047,314 B2 * | 5/2006 | Sato et al. | 709/238 |
| 7,624,112 B2 * | 11/2009 | Ganesh et al. | 718/101 |
| 2005/0210468 A1 | 9/2005 | Chung et al. | |
| 2005/0223188 A1 * | 10/2005 | Moll et al. | 711/202 |

* cited by examiner

*Primary Examiner*—Pierre-Michel Bataille
(74) *Attorney, Agent, or Firm*—Matthew J. Bussan; James R. Nock

(57) ABSTRACT

An operating system kernel includes an attach mechanism and a detach mechanism. In addition, processes are tagged with an access attribute identifying the process as either a client process or a server process. Based on the access attribute, the operating system kernel lays out the process local address space differently depending on whether the process is a client process or a server process. A server process can "attach" to a client process and reference all of the client process' local storage as though it were its own. The server process continues to reference its own process local storage, but in addition, it can reference the other storage, using the client process' local addresses. When access to the other storage is no longer needed, the server process can "detach" from the client process. Once detached, the other storage can no longer be referenced.

30 Claims, 7 Drawing Sheets

METHOD, APPARATUS, AND COMPUTER PROGRAM PRODUCT FOR ACCESSING PROCESS LOCAL STORAGE OF ANOTHER PROCESS

BACKGROUND OF THE INVENTION

1. Field of Invention

The present invention relates in general to the data processing field. More particularly, the present invention relates to the field of addressing schemes in computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems have addressing capabilities that are defined by the computer hardware. The address space of a computer system is the range of addresses available to reference data, instructions, etc., and is determined by the size (in bits) of the address. The address size is one of the fundamental architectural features of a computer system. Early computer systems were single-user computers that could handle only a single task at a time, mapping all data into a single address space, and swapping data into and out of the address space whenever a new task needed to be performed. Later, computers were developed that supported multiple users and processes. A computer system that supports multiple processes must manage the allocation of the address space among the processes. In general, each process has its own working data that is unique to that process. This is true both for uni-processor and multi-processor computer systems.

Computer architectures generally support "process local addressing", wherein storage accesses are resolved only in the context of the executing process. The processor uses process-unique segment tables (which are also referred to in the art as "translation tables") to translate a process local address to a virtual address. Two different processes may reference storage using the same process local address, but because the operating system kernel populates the segment tables with separate virtual address ranges for each process, different virtual addresses are referenced, which then results in accesses to different storage. Process local addressing is commonly used in the industry. The process local addressing mechanism is used to prevent one process from accessing the storage of another process, either by accident or intentionally. Hence it is desirable for the operating system kernel to arrange the working data of each process to reside in process local storage, which is referenced with process local addresses.

However, there are situations where cooperating processes need to share at least a portion of their working storage. Consequently, the operating system kernel typically provides one or more sharing mechanisms whereby cooperating processes share at least a portion of their working storage. Two such sharing mechanisms are respectively referred to as "shared memory" and "memory mapped files". The first sharing mechanism, i.e., shared memory, is a technique whereby the operating system kernel populates a portion of each cooperating process' segment table with the same virtual address ranges, and provides backing storage to support those virtual addresses. Thus the cooperating processes can reference the same storage. Furthermore, if the operating system kernel associates the same process local addresses with the same virtual addresses in each process' segment table, then the cooperating processes can reference the same storage using the same process local addresses.

The second sharing mechanism, i.e., memory mapped files, is a similar technique, but in this case, the backing storage is provided by a file existing somewhere in the file system. The cooperating processes reference the same storage, which is part of the file.

These sharing mechanisms are useful, but require some cooperation between the processes. In this regard, it should be noted that a process' working data is not located in one of the shared areas. A process must explicitly create the shared memory object or map the file, and then must define the portions of its working storage that it wants to share, based on the resultant address of the shared area. Also, the processes must cooperate in addressing the shared storage. If any of the shared storage contains addresses of other portions of the shared storage, then all processes either must be able to reference the shared storage using the same process local addresses, or must be able to apply an offset to the address when referencing the shared storage. In addition, the same care must be taken when storing an address in the shared storage.

In some situations, these sharing mechanisms are difficult or impossible to implement. Often processes must share data which cannot be organized as required for one of the sharing mechanisms. As an example, consider a server process which performs a given server function for a client process. The server function may involve extracting large quantities of data from, or storing large quantities of data into, the storage of the client process. Complexity is introduced by the fact that the client process' storage could be anywhere. For example, it may be in its own working storage or in the working storage of a procedure which called it; it may be in the storage associated with a shared memory object or memory mapped file; it may be in a heap or static storage; or it may be in some combination of these locations. The client process's storage may require traversing complex structures involving several levels of indirection and pointer dereferencing to locate all of the storage to be accessed.

Various techniques for dealing with these complexities are possible, but each undesirably impacts performance. In one such technique, shared memory is used as an intermediate buffer. The server process extracts data from, or puts data into, this intermediate storage and the client process copies data from its own working storage into the shared area before calling a server function, or copies data from the shared area into its own working storage after calling the server function. The overhead associated with the intermediate copy is undesirable, both in terms of setting up the intermediate storage, as well as the duplicated copy, particularly if large quantities of data are involved.

In another technique for dealing with these complexities, an operating system kernel function is used by the server process to "get from" or "put into" the local storage of the client process. Depending on how it is implemented, this may also involve an intermediate copy of data. Regardless, this type of function is very general-purpose in nature, e.g., get/put a specific number (n) of bytes starting at a specified address, and does not possess the know-how to traverse the client data structures. As a result, the server process needs to invoke this function for every leg of the traversal, and again the impact on performance is undesirable.

A need exists for an enhanced mechanism for accessing the process local storage of another process in a controlled manner.

SUMMARY OF THE INVENTION

According to a preferred embodiment of the invention, an operating system kernel includes an attach mechanism and a detach mechanism. In addition, processes are tagged with an access attribute identifying the process as either a client process or a server process. Based on the access attribute, the operating system kernel lays out the process local address space differently depending on whether the process is a client process or a server process. A server process can "attach" to a client process and reference all of the client process' local storage as though it were its own. The server process continues to reference its own process local storage, but in addition, it can reference the client process's local storage, using the client process' local addresses. The server process invokes the kernel's attach mechanism to perform the "attach" by going to the operating system kernel with an attach request. Once attached, the other storage can be referenced in either kernel or user mode. When the server process is done accessing the client process' local storage, the server process invokes the kernel's detach mechanism to perform the "detach" by going to the operating system kernel with a detach request. Once detached, the other storage can no longer be referenced in either kernel or user mode.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1.0 Overview

Figure 1:
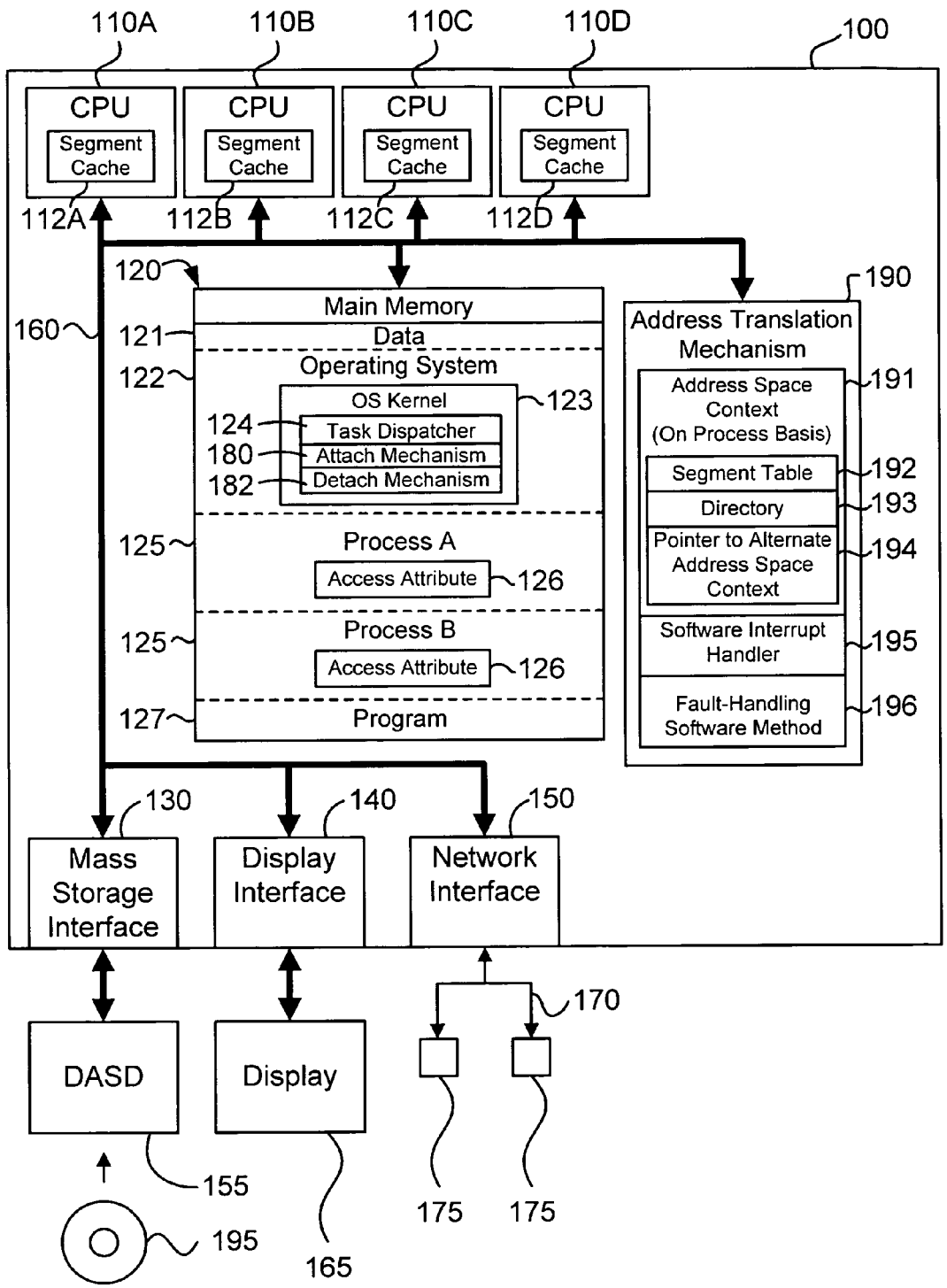
FIG. 1 is a block diagram of a computer apparatus in accordance with the preferred embodiments of the present invention.

The present invention enables a server process to directly access all of a client process' local storage as if it were its own. The server process continues to reference its own process local storage, but in addition, it can reference the client process' local storage, using the client process' local addresses. According to the preferred embodiments of the invention, this capability is provided using an operating system kernel that includes an attach mechanism and a detach mechanism. In addition, processes are tagged with an access attribute identifying the process as either a client process or a server process. Based on the access attribute, the operating system kernel lays out the process local address space differently depending on whether the process is a client process or a server process. For those who are not familiar with the general concepts of local addressing, this addressing scheme is discussed in more detail below, along with definitions used herein.

In discussing addressing modes, the same terms have been used in the art to represent different things to different people. For example, the term "virtual address" as most commonly known in the art refers to an address that may be accessed or that is derived by performing an address calculation, and that is visible to, and can be manipulated by, an executing program. However, this type of virtual address is referred to as an "effective address" in PowerPC terminology. A "virtual address" in PowerPC terminology is an address that is generated from an effective address and that is used internally in the PowerPC address translation scheme. That is generally how the term "virtual address" was used in the Background section herein. Generally speaking, this type of address is subsequently referred to herein as an "internal address" to indicate that this address is not visible to the programmer, but is an address that is generated and used by the address translation mechanism. A "real address" in PowerPC terminology is an address that is used to access real (or physical) memory, and is referred to herein as a "real address".

In "process local addressing", which is commonly used in industry today, storage accesses are resolved only in the context of the executing process. The hardware uses process-unique segment tables to translate a "process local address" to an internal address. An operating system kernel, which is discussed in more detail below, will allocate process local address space and storage for program working data. Two different processes may reference storage using the same process local address, but because the operating system kernel can populate the segment tables with different internal address ranges for each process, the processes access different storage. Unlike conventional process local addressing mechanisms that prevent one process from accessing the storage of another process, either by accident or intentionally, the present invention enables a server process, in a controlled manner, to directly access all of a client process' local storage as if it were its own. According to the preferred embodiments of the present invention, the operating system kernel enables this functionality when requested, and if access is granted, provides access to the other process' storage.

Generally speaking, for the discussion herein and as is common in industry today, the process local address space is comprised of a set of consecutive segments. On a segment basis, the hardware/software translates process local addresses to internal addresses using a segment table. From there, the hardware/software goes on to resolve the internal address to a real address using conventional means that are not important for purposes of the present invention.

2.0 Detailed Description

The preferred embodiments of the invention provide an operating system kernel that includes an attach mechanism and a detach mechanism. In addition, processes are tagged with an access attribute identifying the process as either a client process or a server process. Based on the access attribute, the operating system kernel lays out the process local address space differently depending on whether the process is a client process or a server process. A server process can "attach" to a client process and reference all of the client process' local storage as though it were its own. The server process continues to reference its own process local storage, but in addition, it can reference the client process's local storage, using the client process' local addresses. The server process invokes the kernel's attach mechanism to perform the "attach" by going to the operating system kernel with an attach request. Once attached, the other storage can be referenced in either kernel or user mode. When the server process is done accessing the client process' local storage, the server process invokes the kernel's detach mechanism to perform the "detach" by going to the operating system kernel with a detach request. Once detached, the other storage can no longer be referenced in either kernel or user mode.

Referring now to FIG. 1, a computer system 100 is one suitable implementation of an apparatus in accordance with the preferred embodiments of the invention. Computer system 100 is an enhanced IBM eServer iSeries computer system. However, those skilled in the art will appreciate that the mechanisms and apparatus of the present invention can also apply to any computer system regardless of whether the computer system is a complicated multi-user computing apparatus, a single user workstation, or an embedded control system. As shown in FIG. 1, computer system 100 comprises a plurality of processors 110A, 110B, 110C, and 110D, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

FIG. 1 is intended to depict the representative major components of computer system 100 at a high level, it being understood that individual components may have greater complexity than represented in FIG. 1, and that the number, type and configuration of such components may vary. In particular, computer system 100 may contain a different number of processors than shown. Those skilled in the art will appreciate that the present invention may be practiced using a computer system that has one or more processors.

Main memory 120 in accordance with the preferred embodiments contains data 121, an operating system 122, one or more processes 125, and one or more programs 127. Data 121 represents any data that serves as input to or output from, or working storage for, any program in computer system 100. Operating system 122 is a multitasking operating system known in the industry as OS/400 or IBM i5/OS; however, those skilled in the art will appreciate that the spirit and scope of the present invention is not limited to any one operating system. As is typical, operating system 122 includes an operating system kernel 123 (also referred to herein as "kernel").

Kernel 123 is integrated into operating system 122 and provides kernel level services to operating system components and to other programs, such as program 127. For example, kernel 123 includes a system task dispatcher 124 which is invoked by operating system 122 to assign process 125 to one or more processors 110A, 110B, 110C, and 110D using any of the various mechanisms known in the art. Kernel 123 is the arbiter of security, auditing and control. In accordance with the preferred embodiments of the present invention, kernel 123 provides two new mechanisms: an attach mechanism 180 and a detach mechanism 182. Attach mechanism 180 allows a server process to attach to a client process. Detach mechanism 182 allows a server process to detach from a client process.

Kernel 123 also creates and maintains a set of "attributes" associated with each process 125. Some of the attributes are derived from the user invoking program 127 and others derived from the program itself. A few examples of conventional attributes are user ID, group IDs, and privileges. In addition, in accordance with the preferred embodiments of the present invention, kernel 123 also provides on a new attribute that is herein referred to as an "access attribute" 126 which is associated with each process 125. As mentioned earlier, access attribute 126 tags process 125 as either a client process or a server process.

Also according to the preferred embodiments of the present invention, kernel 123 lays out one or more processes 125 before program 127 is executed. For example, before an application program such as a "web browser" or word processing program is executed, kernel 123 lays out one or more processes 125. Processes 125 is/are laid out first (i.e., before the program begins executing) because as discussed in more detail below, each process 125 has to be tagged as either a client process or a server process, through an access attribute 126, so kernel 123 knows where to arrange the program's process local storage space.

Each process 125 is made up of program instructions that are executed by one or more processors 110A, 110B, 110C, and 110D. As mentioned earlier, one or more processes 125 are created by operating system 122. These may include client processes and server processes. Processes typically contain information about program resources and program execution state.

Computer system 100 utilizes well known virtual addressing mechanisms that allow the programs of computer system 100 to behave as if they have access to a large, single storage entity instead of access to multiple, smaller storage entities such as main memory 120 and DASD device 155. Therefore, while data 121, operating system 122, operating system kernel 123, system task dispatcher 124, attach mechanism 180, detach mechanism 182, one or more processes 125, access attribute(s) 126, and one or more programs 127 are shown to reside in main memory 120, those skilled in the art will recognize that these items are not necessarily all completely contained in main memory 120 at the same time.

Processors 110A, 110B, 110C, and 110D each may be constructed from one or more microprocessors and/or integrated circuits. Preferably, processors 110A, 110B, 110C and 110D are members of a processor architecture family known in the industry as PowerPC architecture; however, those skilled in the art will appreciate that the spirit and scope of the present invention is not limited to any one processor architecture. Processors 110A, 110B, 110C, and 110D execute program instructions stored in main memory 120. Main memory 120 stores programs and data that processors 110A, 110B, 110C, and 110D may access. When computer system 100 starts up, processors 110A, 110B, 110C, and 110D initially execute the program instructions that make up operating system 122. Operating system 122 is a sophisticated program that manages the resources of computer system 100. Some of these resources are processors 110A, 110B, 110C, and 110D, main memory 120, mass storage interface 130, display interface 140, network interface 150, and system bus 160.

Preferably, each processor has an associated segment cache 112A, 112B, 112C, 112D of translation information for translating process local addresses to internal addresses, as discussed in more detail below. For simplicity, processors and segment caches are herein designated generically by reference numbers 110 and 112, respectively. While a single segment cache 112 is shown for each processor 110, there may be multiple levels of segment cache or there may be no segment cache at all. Processor 110 may also have other caches for other purposes, such as caches of memory, some of which may be dedicated to instructions and others to non-executable data.

An address translation mechanism 190 is a mechanism that provides the ability to use an address space to indirectly access real memory, or access real memory through the indirection of an address space. Address translation mechanism 190 is a logical type of entity that, as discussed in more detail below, is augmented by hardware assists embedded within processors 110 and segment caches 112. According to the preferred embodiments of the present invention, address translation mechanism 190 includes, on a process basis, an address space context 191 that translates process local addresses to internal addresses. Address space context 191 is defined as data structures and associated code that goes into making what the user perceives as an address space. As discussed in detail below, address space context 191 includes, on a process basis, a segment table 192, a directory 193 and a pointer to an alternate address space context 194. According to the preferred embodiments of the present invention, multiple levels of address translation information are used in translating process local addresses to internal addresses. Listed in order of increasing size this address translation information includes segment caches 112, segment table 192 and directory 193. In general, address space context 191 is entirely or at least partially implemented in software. As mentioned earlier, the process local address space is comprised of a set of consecutive segments. As is conventional and well known in the art, entries in segment cache 112 are used to translate process local addresses to internal addresses. Segment cache 112 is the first level of translation information used in attempting to translate process local addresses to internal addresses. Generally, the entries in segment cache 112 are searched in parallel (i.e., concurrently) by the hardware in order to quickly determine if there is a match. A segment fault occurs when the process local address is not found among the entries in segment cache 112. If a segment fault occurs, on a segment basis, address translation mechanism 190 according to the preferred embodiments of the present invention and as discussed in more detail below, translates process local addresses to internal addresses using segment table 192, directory 193, and pointer to an alternate address space context 194. From there, the address translation mechanism 190 goes on to resolve the internal address to a real address using conventional means that are not important for purposes of the present invention.

As is well known in the art, the search for the process local address among the entries in segment caches 112 is performed by hardware. If the hardware finds the process local address among the entries in segment caches 112, the hardware translates the process local address to an internal address, which is then resolved to a real address. Typically, if the hardware finds the process local address among the entries in segment cache 112, the software is not informed. On the other hand, if the hardware does not find the process local address among the entries in segment cache 112, a segment fault occurs. In this exception case, depending on the particular implementation used, as explained in more detail below, the software may or may not be informed that a segment fault has occurred.

Segment cache 112 is not large enough to contain the translation information for all of the process local addressing segments. Consequently, as is common in the industry today, a segment table 192 having a larger set of translation information is maintained on a process basis. If a segment fault occurs during translation, an interrupt is generated and a software interrupt handler 195 quickly attempts to locate the translation information from segment table 192 and put the translation information as an entry into segment cache 112, and the instruction which caused the segment fault can be re-executed. Software interrupt handler 195 is conventional and well known in the art, and thus not discussed in detail herein. Alternatively, as is also well known in the art, the search of the segment table may be implemented in hardware, typically without informing the software. For example, processor 110 may know where the segment table is located. In that case, if the segment fault occurs during translation, the processor will attempt to find the translation information in the segment table and put the translation information as an entry into segment cache 112, and the instruction which caused the segment fault can be re-executed.

Directory 193 is larger than segment table 192 because it contains, on a process basis, all of the process local address to internal address translation information for process 125. If software interrupt handler 195 cannot find the necessary translation information in the segment table, then a much longer fault-handling software method 196 is invoked to look up the translation information in directory 193 and use it to populate segment cache 112 and/or segment table 192 before re-executing the faulting instruction. Fault-handling software method 196 is conventional and well known in the art, and thus not discussed in detail herein. Alternatively, in the case where the search of the segment table was implemented in hardware and the hardware could not find the necessary translation information in the segment table, an interrupt is generated and fault-handling software 196 is invoked.

Hence, according to the preferred embodiment of the present invention, software (e.g., software interrupt handler 195 and fault-handling software method 196) loads segment cache 112 with entries from translation information found in segment table 192 or directory 193 when a segment fault occurs. Also according to the preferred embodiments of the present invention, the software flushes the entries from segment caches 112 when they are no longer needed or are invalid, as discussed in more detail below. Also, according to the preferred embodiments of the present invention, processor 110 is constantly referencing and using the entries in segment cache 112, and does not bother to inform the software as long as the search for translation information is successful, i.e. the translation information is found among the entries in segment cache 112. However, when the search is unsuccessful, the hardware informs the software that a segment fault has occurred.

As mentioned above, address space context 191 includes, on a process basis, a pointer to an alternate address space context (also referred to as "pointer" and "alternate address space context pointer") denoted with reference number 194. As discussed in more detail below, during the attach process, pointer 194 of the address space context associated with a server process is set to point to the address space context associated with a client process.

While address space context 191, segment table 192, directory 193, pointer 194, software interrupt handler 195, and fault-handling software method 196 are shown to reside in address translation mechanism 190 for purposes of illustration, those skilled in the art will recognize that these items need not reside together and that one or more of these items may reside in other locations. For example, address space context 191 may reside in kernel 123, while software interrupt handler 195 and fault-handling software method 196 may reside elsewhere in main memory 120. In addition, those skilled in the art will also recognize that these items may be combined, or one or more of the items may be omitted.

Although computer system 100 is shown to contain only a single system bus, those skilled in the art will appreciate that the present invention may be practiced using a computer system that has multiple buses. In addition, the interfaces that are used in the preferred embodiment each include separate, fully programmed microprocessors that are used to off-load compute-intensive processing from processors 110A, 110B, 110C and 110D. However, those skilled in the art will appreciate that the present invention applies equally to computer systems that simply use I/O adapters to perform similar functions.

Display interface 140 is used to directly connect one or more displays 165 to computer system 100. These displays, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 in FIG. 1), and transmission type media such as digital and analog communications links.

Figure 2:
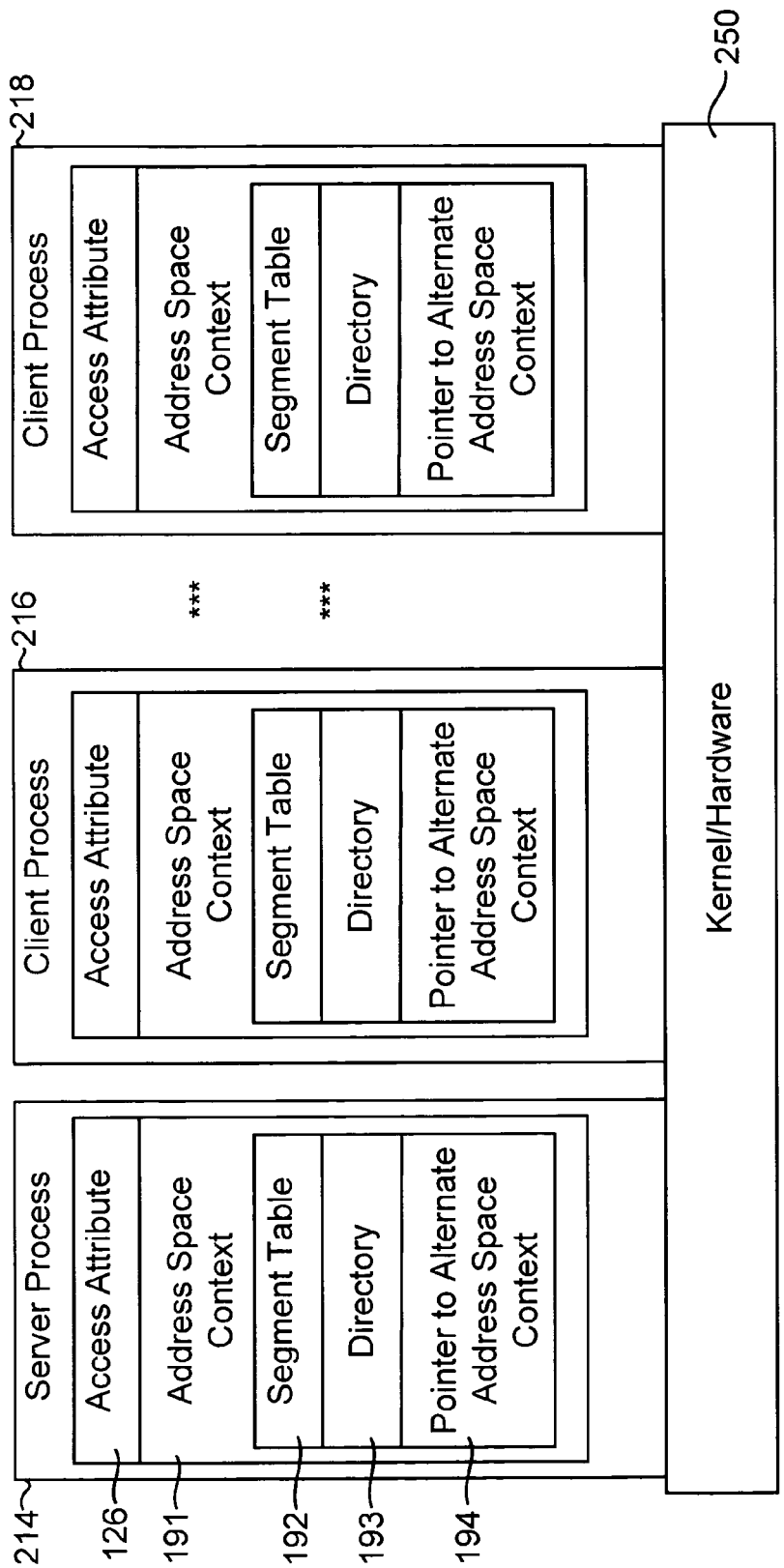
FIG. 2 is a block diagram illustrating various mechanisms associated with each of several exemplary concurrent processes in accordance with the preferred embodiments of the present invention.

FIG. 2 shows a functional block diagram illustrating various mechanisms associated with each of several concurrent user processes 214, 216 and 218. These mechanisms, which include access attribute 126, address space context 191, segment table 192, directory 193, and pointer 194, exist in and run on kernel 123 and hardware such as processors 110. Each process has associated therewith a pointer 194 to an "alternate" address space context 191 (and the alternate address space context's segment table 192 and directory 193, which are respectively referred to as the "process' alternate segment table" and the "process' alternate directory"). For example, pointer 194 associated with server process 214 may point to address space context 191 associated with client process 216 or client process 218. For reasons discussed below, pointer 194 associated with a client process (e.g., client process 216) is not allowed to point to address space context 191 associated with another client process (e.g., client process 218). Likewise, pointer 194 associated with a server process (e.g., server process 214) is not allowed to point to address space context 191 associated with another server process. Initially, pointer 194 is null to indicate that the process currently has no alternate address space context. In the preferred embodiment, pointer 194 associated with client process 216 (or client process 218) always remains null, as client processes never have an alternate address space context.

Processes 214, 216 and 218 can be accessed by "user mode" programs as well as "kernel mode" programs having system-wide privilege, including kernel 123 (shown in FIG. 1) and associated hardware, which are together denoted in FIG. 2 as kernel/hardware 250. Kernel 123 may also access the meta description objects and code associated with the various mechanisms shown in FIG. 2 that are associated with each process.

Kernel 123, as mentioned earlier, provides an access attribute 126 associated with each process. According to the preferred embodiments of the present invention, each of processes 214, 216 and 218 has an access attribute 126 which assumes one of two values. Client is the default attribute value, used by most processes, exemplified by client processes 216 and 218. Processes with this attribute can only reference their own process local storage. Server is the attribute value specified for processes which require the ability to reference the process local storage of a client process. Server process 214 exemplifies such a process.

Figure 3:
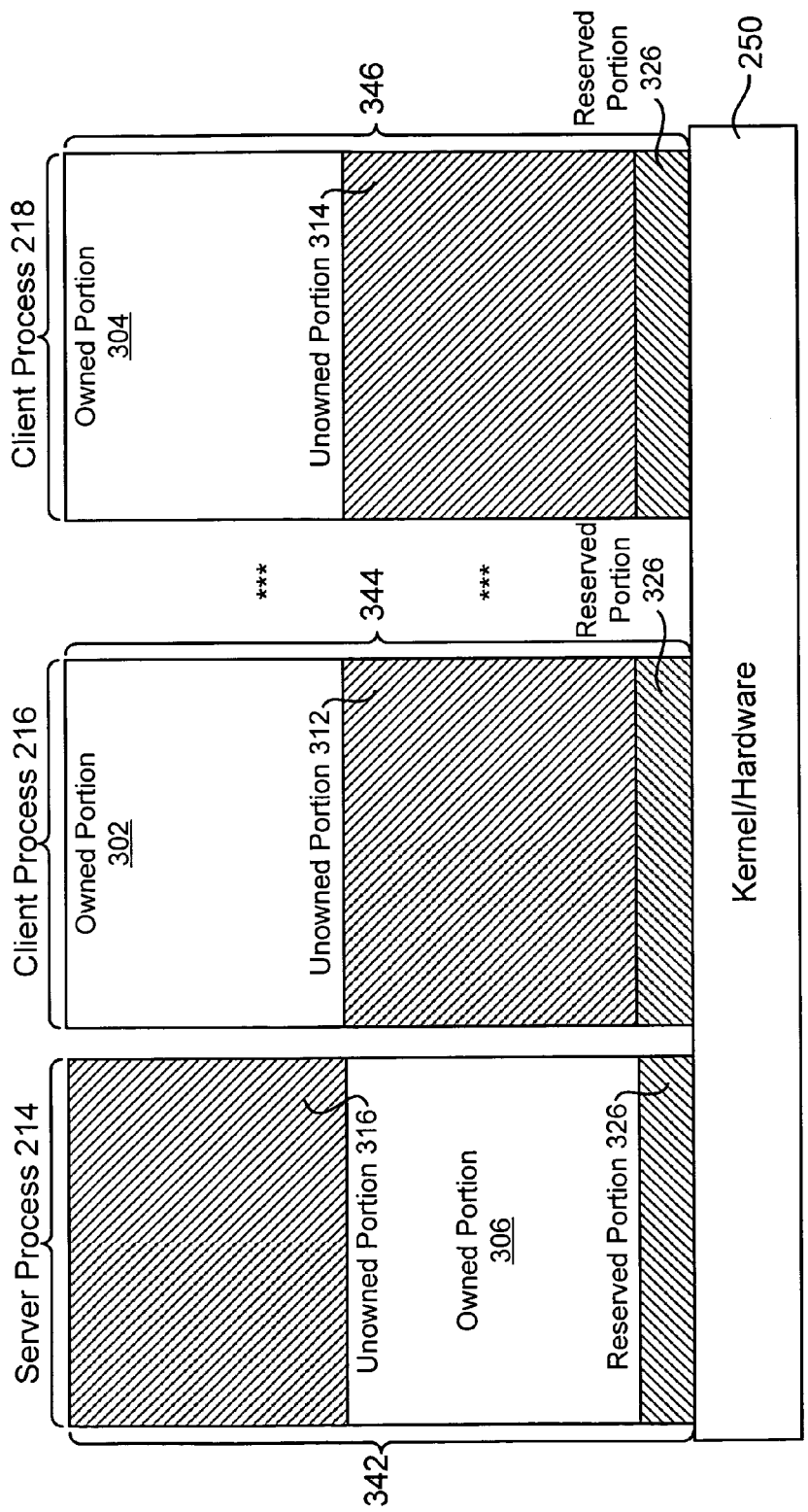
FIG. 3 is a block diagram illustrating the allocation within address space of each of several exemplary concurrent processes in accordance with the preferred embodiments of the present invention.

FIG. 3 is a block diagram illustrating the allocation within the address space of each of processes 214, 216 and 218. The address space associated with each process is exemplified by address space 342 for server process 214, address space 344 for client process 216, and address space 346 for client process 218. The term "address space" is used herein to denote mapping of the process local address range over memory. Although shown in FIG. 3, kernel/hardware 250 is not actually part of the address space, but is shown to illustrate the underpinnings and support kernel/hardware 250 provides for processes 214, 216 and 218. For example, kernel 123, when requested and upon verifying that the request passes various security, auditing and control rules, sets up data structures that impact anything the kernel or user then does that relates to that address space. As shown in FIG. 3, each process 214, 216 and 218 is restricted in the amount of its process local address range that it owns. This restriction may not have been practical on a system with 32-bit addressing because the process reasonably may have needed to use its entire address space. However, on larger systems, such as a system with 64-bit addressing, restricting the process to use something less than its entire process local addressing range is typically not an issue.

For simplicity's sake, and without limitation, assume that processes 214, 216 and 218 are only allowed to own about one-half of their respective address ranges. This can be done relatively simply, for example, by allowing directory 193 to only contain translation information for the address range that each respective process 214, 216 and 218 is allowed to own. Furthermore, based on the value of access attribute 126, assume that client processes such as client processes 216 and 218 own only the "first half" portion 302 and 304 of the process local address range, respectively, and that server processes such as server process 214 own only the "second half" portion 306 of the process local address range. Thus, client processes such as client processes 216 and 218 do not own the "second half" portion 312 and 314 of the process local address range, respectively; and server processes such as server process 214 do not own the "first half" portion 316 of the process local address range. In addition, it is possible, as shown in FIG. 3, to include an optional reserved portion 326 of each respective process local address range. If included, reserved portion 326 is unused and reserved for possible future uses.

The fact that the process local address space was split into first and second halves in the above description was just for convenience in explanation. In the preferred embodiment, some of the address space is not used at all (e.g., reserved portion 326), and the part that can be used (e.g., owned portions 302, 304 and 306, and unowned portions 312, 314 and 316) is not split evenly between client and server processes. The server processes are typically specialized and do not need to own all of the process local storage that must be available to other processes in general. Therefore, the share of address space owned by server processes (e.g., owned portion 306) will typically be much smaller than that owned by client processes (e.g., owned portions 302 and 304).

Process Creation Based on Access Attribute

As mentioned earlier, the kernel starts a process before executing any program in that process. Each process has to be tagged as either a client process or a server process, through an access attribute, so the kernel knows where to arrange the program's process local storage.

Figure 4:
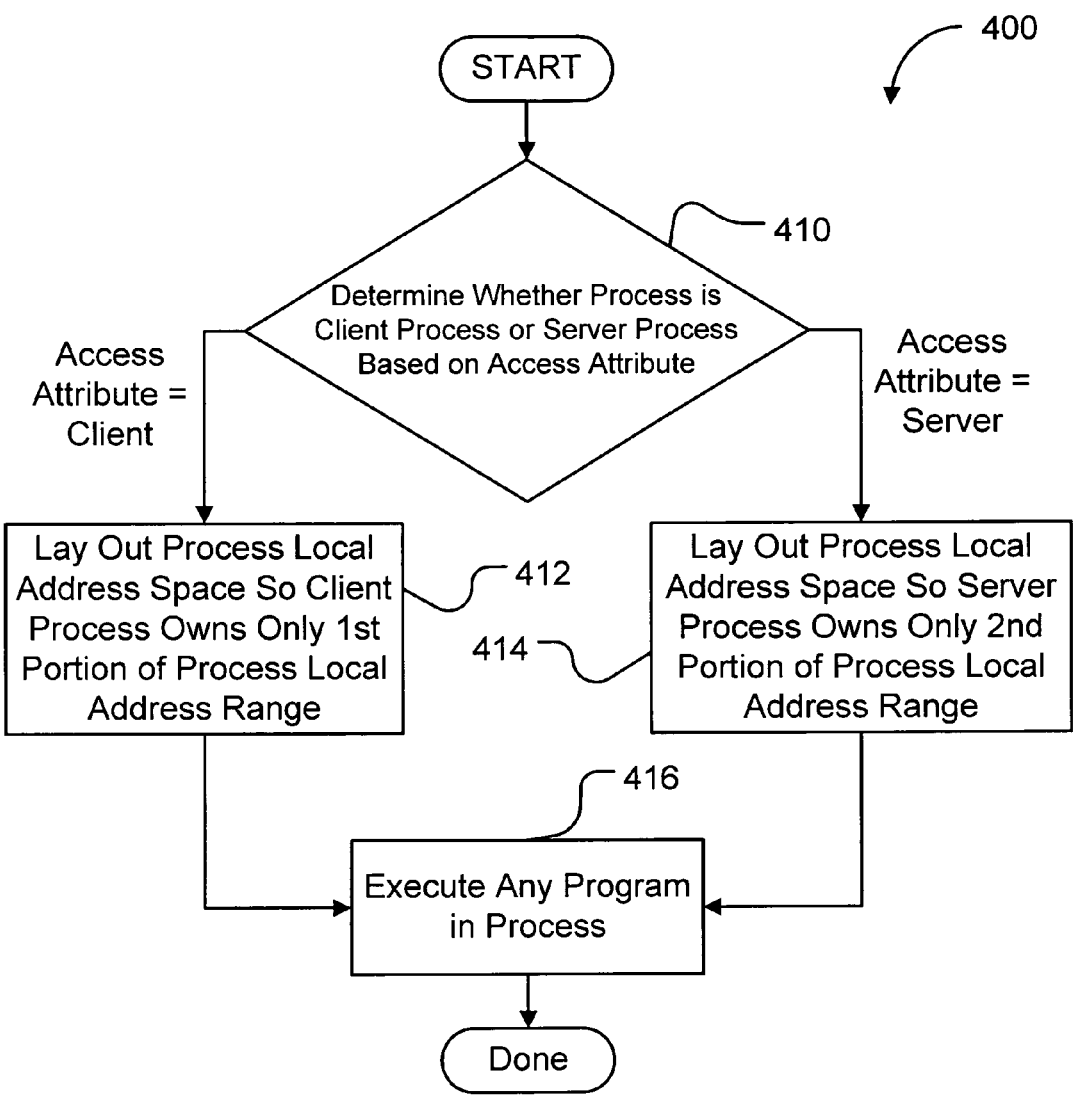
FIG. 4 is a flow diagram illustrating a method for laying out the address space for a process based on an access attribute in accordance with the preferred embodiments of the present invention.

Referring now to FIG. 4, a method 400 for laying out the address space for a process in accordance with the preferred embodiments of the present invention begins when the kernel determines whether a process is a client process or a server process based on the desired attribute value (step 410). The access attribute is specified at or before the time when a program is run. Specifying the access attribute at process create time is preferred. The create process mechanism is well known in the art. Alternatively, the access attribute may be specified at any time the address space is laid out, e.g., at the exec function on UNIX systems.

If the attribute value is client, the kernel lays out the process local address space so the client process owns only a first portion (e.g., the "first half" portion 302 in FIG. 3) of the process local address range of the client process (step 412). In this regard, the kernel lays out the process local address space so the remaining portions of the process local address range of the client process are either unowned or unused. For example, in the case of client process 216 shown in FIG. 3, the kernel lays out the process local address space 344 so that the "second half" portion 312 is unowned, and, if present, the reserved portion 326 is unused. If the attribute value is server, the kernel lays out the process local address space so the server process owns only a second portion (e.g., the "second half" portion 306 in FIG. 3) of the process local address range of the server process (step 414). In this regard, the kernel lays out the process local address space so the remaining portions of the process local address range of the server process are either unowned or unused. For example, in the case of server process 214 shown in FIG. 3, the kernel lays out the process local address space 342 so that the "first half" portion 316 is unowned, and, if present, the reserved portion 326 is unused. Steps 410, 412 and 414 are repeated for each process. Once the kernel lays out a process and knows where to arrange the program's process local storage, program execution can begin within the process (step 416).

Attach Mechanism

Kernel 123, as mentioned earlier, provides a new function which allows a server process to attach to a client process in a controlled manner. For example, returning temporarily to FIG. 2, server process 214 may attach to client process 216 by invoking the attach mechanism of the kernel.

Figure 5:
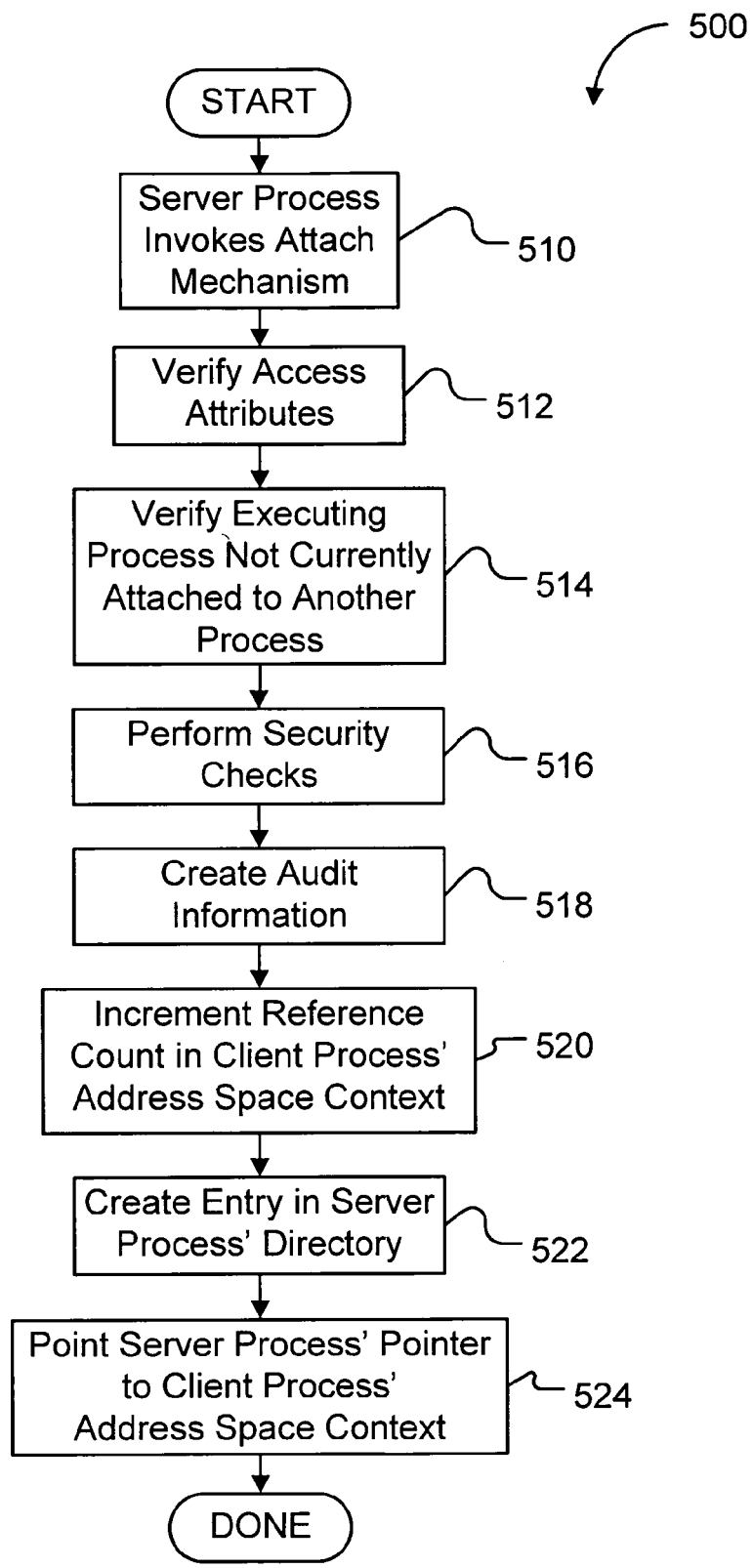
FIG. 5 is a flow diagram illustrating a method for enabling a server process to attach to a client process in accordance with the preferred embodiments of the present invention.

Referring now to FIG. 5, a method 500 for enabling a server process to attach to a client process in a controlled manner in accordance with the preferred embodiments of the present invention begins when the server process invokes the attach mechanism (step 510). More specifically, the server process invokes the attachment mechanism, passing as a parameter, a reference to the client process. The server process invokes the kernel's attach mechanism to perform the "attach" by going to the operating system kernel with an attach request. The kernel enables this functionality when requested, and if access is granted (e.g., the kernel may perform security checks to assure that the server process has authority to attach to the client process), provides access to the client process' storage via the attach mechanism. In carrying out the attach mechanism, the steps discussed below (steps 512-524) are performed. These steps are set forth in their preferred order. It must be understood, however, that the various steps may occur at different times relative to one another than shown, or may occur simultaneously. Moreover, those skilled in the art will appreciate that one or more of the steps may be omitted. In any event, once attached, the other storage can be referenced in either kernel or user mode. Note that the server process will also be able to reference its own process local storage using its own process local addresses.

The kernel verifies that the executing process has the server attribute and the reference process has the client attribute (step 512). The point of this step is that in order to avoid conflicts the two processes must own different portions of the process local address range. The kernel also verifies that the executing process is not currently attached to another process (step 514).

In addition, the kernel performs any security checks desired or necessary to assure that the server process has authority to attach to the client process (step 516). It is desirable to provide access in a controlled manner to prevent unauthorized access to the client process' storage. If the server process has authority to attach to the client process, access is granted. On the other hand, if the server process lacks such authority, access is denied.

As may be desired or required, the kernel creates the information necessary to audit the fact that the server process has gained access to the client process' local storage (step 518). For example, some operating systems require auditing.

The kernel increments the reference count in the client process' address space context (step 520). This assures that if the client process were to terminate, its segment table and directory would continue to exist, so they could still be referenced from the server process.

In addition, the kernel preferably creates an entry in the server process' directory, corresponding to the owned portion of the client process' local address range (step 522). Rather than correlating these process local addresses with internal addresses, this directory entry correlates the entire owned portion of the client local address range (which otherwise is unowned in the server process) with the client address space context. This entry is not needed for fault handling, but is desirable for book-keeping purposes. For example, this entry would facilitate the addition of functions to materialize the directory to see its contents. Materializing the directory makes it possible, for example, to determine whether a server process has addressability to storage of another process.

The kernel also points the server process' alternate address space context pointer to the client process' address space context (step 524).

Mechanism for Handling a Segment Fault

Figure 6:
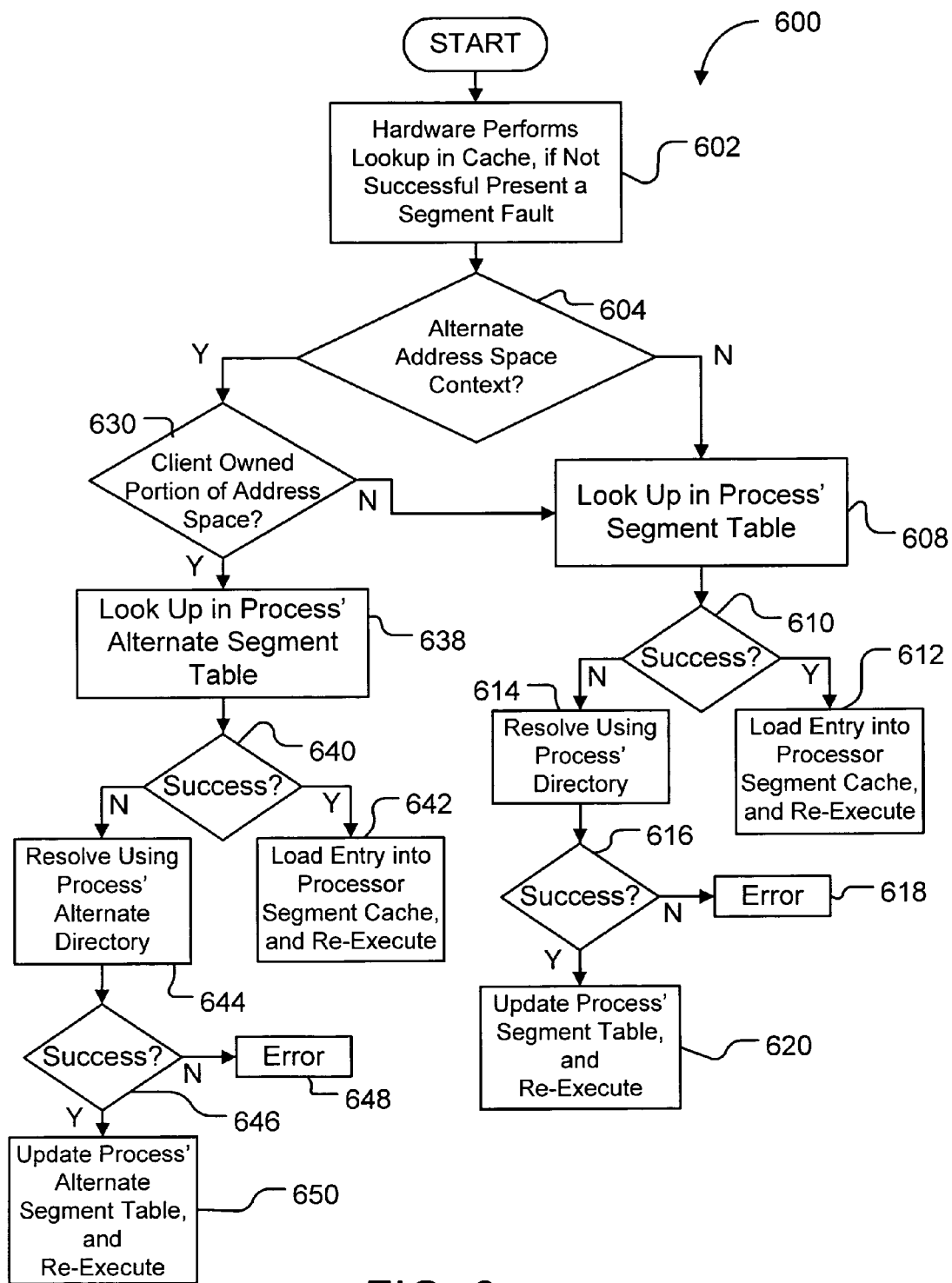
FIG. 6 is a flow diagram illustrating a method for handling a segment fault in accordance with the preferred embodiments of the present invention.

FIG. 6 is a flow diagram illustrating a method 600 for handling a segment fault in accordance with the preferred embodiments of the present invention. In carrying out the mechanism for handling a segment fault, the steps discussed below (steps 602-650) are performed. These steps are set forth in their preferred order. It must be understood, however, that the various steps may occur at different times relative to one another than shown, or may occur simultaneously. Moreover, those skilled in the art will appreciate that one or more of the steps may be omitted. Method 600 begins when a segment fault occurs (step 602). More specifically, the hardware performs an unsuccessful lookup in the segment cache, and the hardware then presents a segment fault. Whenever a segment fault occurs, a determination is made as to whether the process has an alternate address space context (step 604). More specifically, the process' address space context pointer is checked to determine whether it has been set to a non-null value. If it is determined that the process has no alternate address space context, the interrupt handler attempts to resolve the fault by looking for the faulting address in the process' segment table (step 608). Of course, those skilled in the art will appreciate that the search of the segment table may alternatively be implemented in hardware, as discussed above. The success of the interrupt handler's (or hardware's) attempt to resolve the faulting instruction is then determined (step 610). If the interrupt handler (or hardware) is successful, the translation information from the process' segment table is provided to the segment cache as an entry, which is loaded into the processor, and then the faulting instruction is re-executed (step 612).

On the other hand, if the interrupt handler (or hardware) is not able to resolve the fault using the segment table, the longer path is taken to resolve the fault from the process' directory (step 614). In this regard, a conventional fault-handling software method is invoked to look up the translation information in the process' directory. Alternatively, in the case where the search of the segment table was implemented in hardware and the hardware could not find the necessary translation information in the segment table, an interrupt is generated and the fault-handling software is invoked. In any event, the success of the fault-handling software method's attempt to resolve the faulting instruction is then determined (step 616). If the fault-handling software method was not able to resolve the fault using the process' directory, an error is returned (step 618). On the other hand, if the fault-handling software method was successful, the information found in the directory is used to update the process' segment table, and then the faulting instruction is re-executed (step 620). Those skilled in the art will appreciate that re-execution of the faulting instruction in step 620 will again result in a segment fault. However, this second occurrence of the segment fault will result in the shorter path to step 612 being taken, wherein the translation information will be pushed down as an entry into the segment cache, and the faulting instruction will then be successfully re-executed. Alternatively, the translation information may be loaded as an entry into the segment cache in step 620, concurrently with updating the process' segment table.

Returning to step 604, if it is determined that the process has an alternate address space context, the kernel determines whether the faulting address lies in the client owned portion of the address space (step 630). If the faulting address does not lie in the client owned portion of the address space, the method returns to step 608. On the other hand, if faulting address lies in the client owned portion of the address space, steps 638-650 (which generally correspond to the alternate address space context version of the steps 608-620, respectively) are performed.

If the address is in the client-owned portion of the address space, the interrupt handler attempts to resolve the fault by looking for the faulting address in the process' alternate segment table (step 638). Note that the first time the server process attempts to reference storage using a client address, a segment fault will occur, and the interrupt handler will attempt to resolve it using the process' alternate segment table. Subsequent faults will occur as new segments of the client address are referenced. The success of the interrupt handler's attempt to resolve the faulting instruction is then determined (step 640). If the interrupt handler is successful, the translation information from the process' alternate segment table is provided to the segment cache as an entry, which is loaded into the processor, and then the faulting instruction is re-executed (step 642). In the alternative case where the search of the process' segment table is implemented in hardware, the entry in the process' alternate segment table must be copied into the process' segment table in step 642 so that the hardware can find the copy.

On the other hand, if the interrupt handler is not able to resolve the fault using the process' alternate segment table, the longer path is taken to resolve the fault from the process' alternate directory (step 644). In this regard, a conventional fault-handling software method is invoked to look up the translation information in the process' alternate directory. Alternatively, in the case where the search of the segment table was implemented in hardware and the hardware could not find the copy of the necessary translation information in the process' segment table, an interrupt is generated and the fault-handling software is invoked. In any event, the success of the fault-handling software method's attempt to resolve the faulting instruction is then determined (step 646). If the fault-handling software method was not able to resolve the fault using the process' alternate directory, an error is returned (step 648). On the other hand, if the fault-handling software method was successful, the information found in the process' alternate directory is used to update the process' alternate segment table, and then the faulting instruction is re-executed (step 650). Again, those skilled in the art will appreciate that re-execution of the faulting instruction in step 650 will again result in a segment fault. However, this second occurrence of the segment fault will result in the shorter path to step 642 being taken, wherein the translation information will be pushed down as an entry into the segment cache, and the faulting instruction will then be successfully re-executed. Alternatively, the translation information may be loaded as an entry into the segment cache in step 650, concurrently with updating the process' alternate segment table.

Detach Mechanism

Kernel 123, as mentioned above, also provides a new function which allows a server process to detach from a client process. For example, returning temporarily to FIG. 2, server process 214 may detach from client process 216 by invoking the detach mechanism of the kernel.

Figure 7:
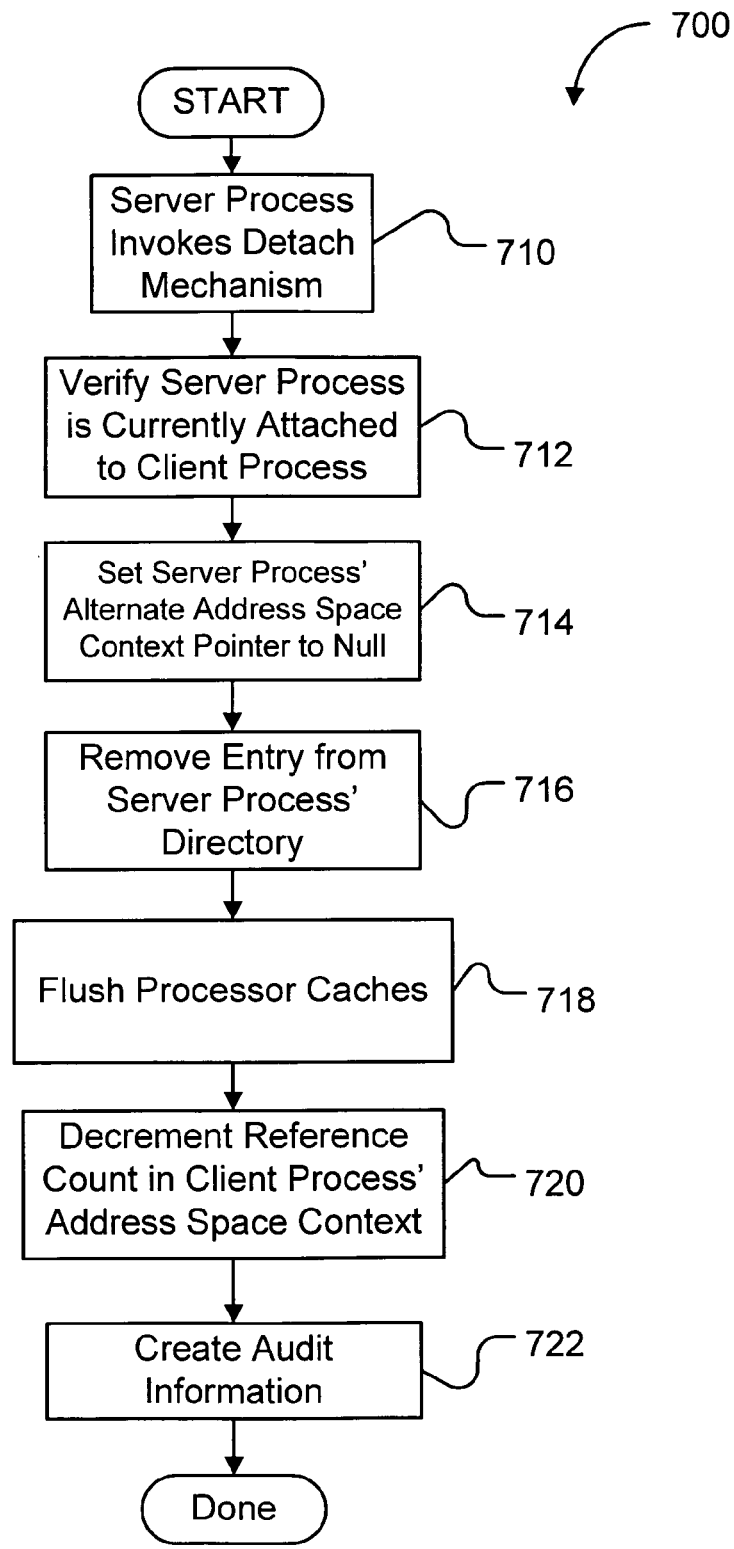
FIG. 7 is a flow diagram illustrating a method for enabling a server process to detach from a client process in accordance with the preferred embodiments of the present invention.

Referring now to FIG. 7, a method 700 for enabling a server process to detach from a client process in accordance with the preferred embodiments of the present invention begins when the server process invokes the detach mechanism (step 710). The server process invokes this function when access to the client process' local storage is no longer needed. When the server process is done accessing the client process' local storage, the server process invokes the kernel's detach mechanism to perform the "detach" by going to the operating system kernel with a detach request. In carrying out the detach mechanism, the steps discussed below (steps 712-722) are performed. These steps are set forth in their preferred order. It must be understood, however, that the various steps may occur at different times relative to one another than shown, or may occur simultaneously. Moreover, those skilled in the art will appreciate that one or more of the steps may be omitted. In any event, once detached, the other storage can no longer be referenced in either kernel or user mode. At that point the server process can only access its own local storage.

The kernel verifies that the server process is attached to a client process (step 712). The kernel also sets the server process' alternate address space context pointer to null (step 714). In addition, the kernel removes the entry from the server process' directory created in step 522 (shown in FIG. 5) that correlated client process local addresses with the client process' address space context (step 716).

The kernel flushes relevant entries from the segment caches of all processors that are currently running threads of the process (step 718). Also, in the alternative case where the search of the server process' segment table is implemented in hardware, the kernel also invalidates relevant entries in the server process' segment table. This is because in that alternative case, as discussed above, entries in the client process' segment table may have been copied into the server process' segment table.

With regard to flushing in general, those skilled in the art will appreciate that while a process is observing (i.e., attached to) another process, if the observed process makes changes to the observed process' address space, the kernel has the responsibility to do certain levels of notifying, flushing of the segment caches, etc. for all processes observing that process. Otherwise, the observing process(es) would be using stale address translation information that the observed process has removed or replaced with something different. In other words, the right data is not going to be seen in the observing process' view, i.e., the observing process will see different data than does the observed process. Generally, when a process removes a segment or memory from the address space, it is well known in the art to broadcast to processors that may be running other threads of the process. In accordance with the preferred embodiments of the present invention, the broadcast to flush out translation information is made not only to processors that may be running other threads of the process, but also to processors that may be running the observing process.

Referring now back to FIG. 7, the kernel also decrements the reference count in the client process' address space context (step 720). If the client process has already terminated, this would now allow all of its process local addressing structure to be destroyed.

As may be desired or required, the kernel creates the information necessary to audit the fact that the server process no longer has access to the client process' local storage (step 722).

One skilled in the art will appreciate that many variations are possible within the scope of the present invention. For example, in the preferred embodiment there are only two types of processes and only one way that they attach. One skilled in the art will appreciate, however, there are other extensions of this mechanism. These extensions include the ability of the client process to also attach back to the same server process, or to attach to a different server process. Another extension involves multiple kinds of processes, where each kind owns a unique portion of the process local address range, and any kind of process would be able to attach to any other kind of process. In yet another extension, if each process has multiple pointers to multiple alternate address space contexts, one process could simultaneously be attached to multiple other kinds of processes. Again, to avoid conflicts, each kind of process owns a unique portion of the process local address range. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An apparatus, comprising:
   at least one processor;
   a memory coupled to the at least one processor;
   a client process residing in the memory, the client process can reference only its own process local storage;
   a server process residing in memory, the server process can reference its own process local storage and requires the ability to access to the process local storage of the client process;
   an operating system kernel residing in memory and executed by the at least one processor, the operating system kernel having an attach mechanism that when invoked enables the server process to attach to the client process so the server process can reference the process local storage of the client process using process local addresses of the client process, as well as retaining access to its own process local storage.

2. The apparatus as recited in claim 1, wherein the client process has associated therewith an access attribute with an attribute value indicating that the client process is restricted to referencing its own process local storage, and the server process has associated therewith an access attribute with an attribute value indicating that the server process requires the ability to reference the process local storage of the client process.

3. The apparatus as recited in claim 2, wherein based on the attribute value of the access attribute, the operating system kernel lays out the process local address space for the client process differently than that for the server process.

4. The apparatus as recited in claim 3, wherein the process local storage of the client process is defined by a first process local address range having at least a first portion and a second portion, wherein the first portion of the first process local address range is owned by the client process and the second portion of the first process local address range is unowned by the client process, and wherein the process local storage of the server process is defined by a second process local address range having at least a first portion and a second portion respectively corresponding to the first portion and the second portion of the first process local address range, wherein the first portion of the second process local address range is unowned by the server process and the second portion of the second process local address range is owned by the server process.

5. The apparatus as recited in claim 4, wherein the operating system kernel further comprises a detach mechanism that when invoked enables the server process to detach from the client process so the server process can no longer reference the process local storage of the client process.

6. The apparatus as recited in claim 1, further comprising at least one of an interrupt handler and a fault-handling method residing in memory and executed by the processor, wherein the interrupt handler/fault-handling method attempts to resolve a segment fault using at least one of a segment table and a directory of an address space context if the server process is referencing its own process local storage, and the interrupt handler/fault-handling method attempts to resolve a segment fault using at least one of a segment table and a directory of an alternate address space context if the server process is referencing the process local storage of the client process.

7. The apparatus as recited in claim 6, wherein the address space context comprises a pointer to the alternate address space context, and wherein the operating system kernel sets the pointer once the attach mechanism is invoked.

8. The apparatus as recited in claim 7, wherein the operating system kernel further comprises a detach mechanism that when invoked enables the server process to detach from the client process so the server process can no longer reference the process local storage of the client process, and wherein the operating system sets the pointer to null once the detach mechanism is invoked.

9. The apparatus as recited in claim 1, wherein the operating system kernel further comprises a detach mechanism that when invoked enables the server process to detach from the client process so the server process can no longer reference the process local storage of the client process.

10. An apparatus, comprising:
at least one processor;
a memory coupled to the at least one processor;
a first process residing in the memory;
a second process residing in the memory;
an address space that is addressable by at least one instruction executed by the at least one processor, the address space comprising:
    a first process local storage of the first process defined by a first process local address range having at least a first portion and a second portion, wherein the first portion of the first process local address range is owned by the first process and the second portion of the first process local address range is unowned by the first process;
    a second process local storage of the second process defined by a second process local address range having at least a first portion and a second portion respectively corresponding to the first portion and the second portion of the first process local address range, wherein the first portion of the second process local address range is unowned by the second process and the second portion of the second process local address range is owned by the second process.

11. The apparatus as recited in claim 10, wherein the first process has an access attribute with an attribute value of client indicating that the first process is a client process restricted to referencing the first portion of the first process local storage, and wherein the second process has an access attribute with an attribute value of server indicating that the second process is a server process requiring the ability to reference the first portion of the first process local storage, as well as retaining access to the owned portion of its process local storage.

12. The apparatus as recited in claim 10, wherein the first portion of the first process local address range and the first portion of the second process local address range each define an address space that is larger than that of the second portion of the first process local address range and the second portion of the second process local storage address range.

13. The apparatus as recited in claim 10, wherein the first process local address range and the second process local address range each have a third portion mutually exclusive of the first portion and the second portion, and wherein the third portion of the first process local address range and the third portion of the second process local address range are unowned or not usable by the first process and the second process, respectively.

14. The apparatus as recited in claim 10, further comprising an operating system kernel residing in memory and executed by the at least one processor, the operating system kernel having an attach mechanism that when invoked enables the second process to attach to the first process so the second process can reference the first portion of the process local storage of the first process using process local addresses of the first process, as well as retaining access to the owned portion of its process local storage.

15. A computer-implemented method executing instructions on a computer system for laying out a process local address space based on an attribute value of an access attribute, the layout facilitating one process accessing process local storage of another process, comprising the steps of (A) determining whether a process is a server process or a client process based on an attribute value of an access attribute, wherein a client process can reference only its own process local storage, and wherein a server process can reference its own process local storage and requires the ability to access the process local storage of a client process;
    (B) if the attribute value of the process indicates that the process is a client process, laying out the process local address space so the client process is defined by a process local address range having at least a first portion and a second portion, wherein the client process owns only the first portion of its process local address range;
    (C) if the attribute value of the process indicates that the process is a server process, laying out the process local address space so the server process is defined by a process local address range having at least a first portion and a second portion, wherein the first portion and second portion respectively correspond to the first portion and the second portion of the process local address range of the client process, and wherein the server process owns only the second portion of the process local address range of its process local address range.

16. The computer-implemented method as recited in claim 15, further comprising the step of
    (D) repeating steps (A)-(C) for each process before execution of any program in the process.

17. A computer-implemented method executing instructions on a computer system for enabling one process to access process local storage of another process, comprising the steps of:
    (A) creating a client process, wherein the client process can reference only its own process local storage;
    (B) creating a server process, wherein the server process can reference its own process local storage and requires the ability to access to the process local storage of the client process;
    (C) creating an address space context, on a process basis, comprising a segment table, a directory and a pointer to an alternate address space context;
    (D) setting the pointer in the server process' address space context to point to the client process' address space context;
    (E) if a segment fault occurs, determining whether the faulting address being referenced by the server process lies in a client owned portion of the client process' address space;
    (F) if it is determined in step (E) that the faulting address does not lie in the client owned portion of the client process' address space, attempting to resolve the segment fault using at least one of the segment table and the directory of the server process's address space context;
    (G) if it is determined in step (E) that the faulting address lies in the client owned portion of the client process' address space, attempting to resolve the segment fault using at least one of the segment table and the directory of the client process' address space context based on the pointer set in step (D).

18. The computer-implemented method as recited in claim 17, wherein step (F) comprises the steps of:
   (F1) attempting to resolve the segment fault using the segment table of the server process' address space context;
   (F2) if step (F1) fails, attempting to resolve the segment fault using the directory of the server process' address space context.

19. The computer-implemented method as recited in claim 18, wherein step (G) comprises the steps of:
   (G1) attempting to resolve the segment fault using the segment table of the client process' address space context;
   (G2) if step (G1) fails, attempting to resolve the segment fault using the directory of the client process' address space context.

20. The computer-implemented method as recited in claim 17, wherein step (G) comprises the steps of:
   (G1) attempting to resolve the segment fault using the segment table of the client process' address space context;
   (G2) if step (G1) fails, attempting to resolve the segment fault using the directory of the client process' address space context.

21. A computer program product for laying out a process local address space based on an attribute value of an access attribute, the layout facilitating one process accessing process local storage of another process, the computer program product comprising a plurality of computer executable instructions provided on a non-transitory computer readable signal bearing storage media, said program comprising the steps of:
   (A) determining whether a process is a server process or a client process based on an attribute value of an access attribute, wherein a client process can reference only its own process local storage, and wherein a server process can reference its own process local storage and requires the ability to access the process local storage of a client process;
   (B) if the attribute value of the process indicates that the process is a client process, laying out the process local address space so the client process is defined by a process local address range having at least a first portion and a second portion, wherein the client process owns only the first portion of its process local address range;
   (C) if the attribute value of the process indicates that the process is a server process, laying out the process local address space so the server process is defined by a process local address range having at least a first portion and a second portion, wherein the first portion and second portion respectively correspond to the first portion and the second portion of the process local address range of the client process, and wherein the server process owns only the second portion of the process local address range of its process local address range.

22. The computer program product as recited in claim 21, wherein the program further performs the step of:
   (D) repeating steps (A)-(C) for each process before execution of any program in the process.

23. The computer program product as recited in claim 21, wherein the signal bearing media comprises recordable media.

24. The computer program product as recited in claim 21, wherein the signal bearing media comprises transmission media.

25. A computer program product for enabling one process to access process local storage of another process, the computer program product comprising a plurality of computer executable instructions provided on a non-transitory computer readable signal bearing storage media, said program comprising the steps of:
   (A) creating a client process, wherein the client process can reference only its own process local storage;
   (B) creating a server process, wherein the server process can reference its own process local storage and requires the ability to access to the process local storage of the client process;
   (C) creating an address space context, on a process basis, comprising a segment table, a directory and a pointer to an alternate address space context;
   (D) setting the pointer in the server process' address space context to point to the client process' address space context;
   (E) if a segment fault occurs, determining whether the faulting address being referenced by the server process lies in a client owned portion of the client process' address space;
   (F) if it is determined in step (E) that the faulting address does not lie in the client owned portion of the client process' address space, attempting to resolve the segment fault using at least one of the segment table and the directory of the server process's address space context;
   (G) if it is determined in step (E) that the faulting address lies in the client owned portion of the client process' address space, attempting to resolve the segment fault using at least one of the segment table and the directory of the client process' address space context based on the pointer set in step (D).

26. The computer program product as recited in claim 25, wherein step (F) comprises the steps of:
   (F1) attempting to resolve the segment fault using the segment table of the server process' address space context;
   (F2) if step (F1) fails, attempting to resolve the segment fault using the directory of the server process' address space context.

27. The computer program product as recited in claim 26, wherein step (G) comprises the steps of:
   (G1) attempting to resolve the segment fault using the segment table of the client process' address space context;
   (G2) if step (G1) fails, attempting to resolve the segment fault using the directory of the client process' address space context.

28. The computer program product as recited in claim 25, wherein step (G) comprises the steps of:
   (G1) attempting to resolve the segment fault using the segment table of the client process' address space context;
   (G2) if step (G1) fails, attempting to resolve the segment fault using the directory of the client process' address space context.

29. The computer program product as recited in claim 25, wherein the signal bearing media comprises recordable media.

30. The computer program product as recited in claim 25, wherein the signal bearing media comprises transmission media.

* * * * *